(12) United States Patent
Haegebarth et al.

(10) Patent No.: US 7,613,563 B2
(45) Date of Patent: Nov. 3, 2009

(54) NAVIGATION SERVICE

(75) Inventors: Frank Haegebarth, Kirchheim (DE); Kurt Lösch, Stuttgart (DE)

(73) Assignee: Alcatel, Paris (FR)

( * ) Notice: Subject to any disclaimer, the term of this patent is extended or adjusted under 35 U.S.C. 154(b) by 272 days.

(21) Appl. No.: 11/300,472

(22) Filed: Dec. 15, 2005

(65) Prior Publication Data
US 2006/0161341 A1 Jul. 20, 2006

(30) Foreign Application Priority Data
Jan. 14, 2005 (EP) .................... 05290088

(51) Int. Cl.
*G08G 1/0968* (2006.01)
(52) U.S. Cl. ...................... 701/117; 701/207
(58) Field of Classification Search ........................ None
See application file for complete search history.

(56) References Cited

U.S. PATENT DOCUMENTS

| | | | | |
|---|---|---|---|---|
| 4,023,753 A | * | 5/1977 | Dobler | 246/5 |
| 5,295,551 A | * | 3/1994 | Sukonick | 180/167 |
| 5,331,561 A | * | 7/1994 | Barrett et al. | 701/205 |
| 5,369,591 A | * | 11/1994 | Broxmeyer | 701/301 |
| 5,420,794 A | * | 5/1995 | James | 701/117 |
| 5,428,544 A | * | 6/1995 | Shyu | 701/117 |
| 5,546,311 A | * | 8/1996 | Sekine | 701/208 |
| 5,610,821 A | * | 3/1997 | Gazis et al. | 455/456.5 |
| 5,680,122 A | * | 10/1997 | Mio | 340/932 |
| 5,696,503 A | * | 12/1997 | Nasburg | 340/933 |
| 5,777,451 A | * | 7/1998 | Kobayashi et al. | 318/587 |
| 5,781,119 A | * | 7/1998 | Yamashita et al. | 340/903 |
| 5,801,943 A | * | 9/1998 | Nasburg | 701/117 |
| 5,957,983 A | * | 9/1999 | Tominaga | 701/23 |
| 6,032,097 A | * | 2/2000 | Iihoshi et al. | 701/96 |
| 6,128,559 A | * | 10/2000 | Saitou et al. | 701/23 |
| 6,167,331 A | * | 12/2000 | Matsumoto et al. | 701/23 |
| 6,169,940 B1 | * | 1/2001 | Jitsukata et al. | 701/23 |
| 6,169,954 B1 | * | 1/2001 | McCrary | 701/117 |
| 6,246,932 B1 | * | 6/2001 | Kageyama et al. | 701/24 |
| 6,246,955 B1 | * | 6/2001 | Nishikawa et al. | 701/117 |
| 6,249,232 B1 | * | 6/2001 | Tamura et al. | 340/902 |
| 6,282,468 B1 | * | 8/2001 | Tamura | 701/23 |

(Continued)

FOREIGN PATENT DOCUMENTS

EP 1 274 058 B1 1/2003

(Continued)

*Primary Examiner*—Eric Bolda
*Assistant Examiner*—Ari M Diacou
(74) *Attorney, Agent, or Firm*—Sughrue Mion, PLLC

(57) ABSTRACT

A group of two or more vehicles (21, 22, 23), each vehicle (21, 22, 23) comprising a communication unit (210, 220, 230) coupled with a navigation unit (211, 221, 231), wherein one vehicle of the group is classified as master vehicle (21) leading the group and the remaining vehicles of the group are classified as slave vehicles (22, 23) following the master vehicle (21), travel together. A central remote navigation server (30) provides the vehicles (21, 22, 23) with a navigation service, wherein the navigation server (30) calculates for each of the slave vehicles (22, 23) route instructions (506, 606) such that the slave vehicles (22, 23) are instructed to follow the master vehicle (21). The route instructions (506, 606) are transmitted to the slave vehicles (22, 23) via a communication network (10).

18 Claims, 4 Drawing Sheets

U.S. PATENT DOCUMENTS

| | | | |
|---|---|---|---|
| 6,301,530 B1 * | 10/2001 | Tamura | 701/23 |
| 6,310,561 B1 * | 10/2001 | Nomura et al. | 340/905 |
| 6,313,758 B1 * | 11/2001 | Kobayashi | 340/932 |
| 6,343,247 B2 * | 1/2002 | Jitsukata et al. | 701/28 |
| 6,356,189 B1 * | 3/2002 | Fujimaki | 340/465 |
| 6,356,820 B1 * | 3/2002 | Hashimoto et al. | 701/23 |
| 6,421,600 B1 * | 7/2002 | Ross | 701/117 |
| 6,553,288 B2 * | 4/2003 | Taguchi et al. | 701/23 |
| 6,619,212 B1 * | 9/2003 | Stephan et al. | 104/292 |
| 6,681,175 B2 * | 1/2004 | MacPhail et al. | 701/117 |
| 6,708,085 B2 * | 3/2004 | Yamane et al. | 701/1 |
| 6,732,024 B2 * | 5/2004 | Wilhelm Rekow et al. | 701/26 |
| 6,963,795 B2 * | 11/2005 | Haissig et al. | 701/7 |
| 7,382,274 B1 * | 6/2008 | Kermani et al. | 340/901 |
| 2002/0165649 A1 | 11/2002 | Wilhelm Rekow et al. | |
| 2003/0009280 A1 * | 1/2003 | Hagebarth | 701/209 |
| 2003/0102997 A1 * | 6/2003 | Levin et al. | 342/57 |
| 2004/0193372 A1 * | 9/2004 | MacNeille et al. | 701/213 |
| 2005/0003844 A1 * | 1/2005 | Nishiga et al. | 455/517 |
| 2005/0171690 A1 * | 8/2005 | Brass et al. | 701/207 |
| 2005/0222716 A1 * | 10/2005 | Tengler et al. | 701/1 |

FOREIGN PATENT DOCUMENTS

WO    WO 2004/077378 A1    9/2004

\* cited by examiner

NAVIGATION SERVICE

The invention is based on a priority application EP 05290088.3 which is hereby incorporated by reference.

FIELD OF THE INVENTION

The invention relates to a method for providing vehicles with a navigation service as well as a navigation server and a navigation system for executing the method.

BACKGROUND OF THE INVENTION

The availability of exact navigation means like, e.g., GPS, to common transport vehicles, for example cars, has greatly facilitated route navigation (GPS=Global Positioning System). The driver of a vehicle no longer has to look for his way in paper road maps. Instead he is conveniently guided by visual and/or accoustic path information offered via an electronic navigation system.

Basically, navigation systems can be distinguished between on-board and off-board systems. On-board navigation devices are stand-alone devices which hold a road map database of a preferred travel area (usually stored on an exchangeable data carrier like,. e.g., CD-ROM, DVD) and calculate a route by means of an on-board processor. To adapt to changes of the road network, the road map database stored in the navigation device must be updated once in a while.

With the increasing capabilities of wireless communication networks like, e.g., GSM or UMTS, the off-board solution becomes increasingly important (GSM=Global System for Mobile Communication, UMTS=Universal Mobile Telecommunications System).

For example, EP 1 274 058 B1 describes that a request for route information is communicated via a wireless communication network from a driver's communication terminal to a remote central server continuously provided with updated road map databases and current traffic conditions. The central server calculates the route and transmits the corresponding route information back to the driver. Thus the need for complex navigation devices in the vehicle is avoided, the driver can navigate by means of a simple and inexpensive communication means, like a mobile phone, and the calculated route information includes the latest changes in road network and traffic condition.

It is the object of the present invention to provide an improved navigation service.

The object of the present invention is achieved by a method for providing vehicles with a navigation service, wherein the method comprises the steps of building a group of two or more vehicles, each vehicle comprising a communication unit coupled with a navigation unit, wherein one vehicle of the group is classified as master vehicle leading the group and the remaining vehicles of the group are classified as slave vehicles following the master vehicle; determining geographical position data of the master vehicle and the slave vehicles; communicating geographical position data of the master vehicle and the slave vehicles to one or more data processing units; calculating by the one or more data processing units for each of the slave vehicles route instructions in accordance with the route traveled by the master vehicle based on the received geographical position data of the master vehicle and the respective slave vehicle; and communicating the respective route instructions to a driver of the respective slave vehicle.

The object of the present invention is further achieved by a navigation server for providing vehicles with a navigation service, the navigation server comprising a data base for storing communication addresses assigned to two or more vehicles, each vehicle comprising a communication unit coupled to a navigation unit, a group building unit for building a group of the two or more vehicles, wherein one vehicle of the group is classified within the data base as master vehicle leading the group and the remaining vehicles of the group are classified within the data base as slave vehicles following the master vehicle, an interface unit for receiving geographical position data of the master vehicle and the slave vehicles via a communication network, and a data processing unit arranged to calculate for each of the slave vehicles route instructions in accordance with the route traveled by the master vehicle based on the received geographical position data of the master vehicle and the respective slave vehicle and to transmit the route instructions to the communication units of the slave vehicles via the communication network based on the communication addresses stored in the data base.

The object of the present invention is further achieved by a navigation system for providing vehicles with a navigation service, the system comprising two or more navigation units having a data processing unit, each navigation unit assigned to a vehicle and coupleable with a respective communication unit for communicating via a communication network, and an output unit, wherein the navigation system comprises a mediation server arranged to build a group of two or more vehicles, wherein one vehicle of the group is classified as master vehicle leading the group and the remaining vehicles of the group are classified as slave vehicles following the master vehicle, to store communication addresses the communication units assigned to vehicles of the group, that each data processing unit assigned to the slave vehicles is arranged to calculate for the respective slave vehicle route instructions in accordance with the route traveled by the master vehicle based on received geographical position data of the master vehicle and the respective slave vehicle, and to transmit the route instructions to the output unit to be communicated to the driver of the respective slave vehicle.

The use of the invention offers an improved way of providing vehicles with a navigation service.

Travelling together in a group of two or more vehicles is a driving situation, e.g., wherein a driver familiar with a route in his vehicle leading the group and followed by the other vehicles of the group, or likewise, a couple of families each in their own vehicle travelling together to the same holiday destination.

Due to bad weather conditions, heavy traffic, unforeseen stops, or similar reasons, intervisibility among the travelling vehicles may be intermitted or even lost. Particularly, this poses a problem in densely populated areas with heavy traffic. The invention prevents the following vehicles of the group to deviate from the route traveled by the leading vehicle and to eventually lose their way. The accurate and reliable guidance of the vehicles of the group shortens the journey time because the chance of following vehicles getting lost is minimized. By use of the invention, the situation that lost drivers are forced to cumbersomely rejoin the group by waiting, searching, or by calling over mobile telephones is anticipated.

Conventionally travelling together in a group of two or more vehicles makes high demands to the drivers as they must pay attention both to the traffic and the leading and/or following vehicle. The invention facilitates relaxed driving conditions when travelling in a group of vehicles, both for the leading vehicle as well as for the following vehicles. It relieves the high burden of the drivers, the drivers do not become easily exhausted and are less likely to get involved in a traffic accident. Furthermore, the invention offers a convenient possibility to signalize a request for a stop from one of the rear vehicles to the vehicle leading the group.

Further advantages are achieved by the embodiments of the invention indicated by the dependent claims.

According to a preferred embodiment of the invention, the positions of the master vehicle and one or more slave vehicles are indicated to the driver, e.g., by blinking or colored dots, on a road map which is electronically displayed on a display. The display can be integrated within a communication unit or a navigation unit located in the vehicle. The electronic road map as well as the positions of the vehicles can also be displayed on a stand-alone display, which may be permanently integrated in the vehicle, e.g., within the dashboard. By indicating the current position of the master vehicle and one or more slave vehicles, the drivers are provided with a better orientation.

The method according to the invention can be implemented both as an off-board and as an on-board version. Besides, there is also a variety of hybrid solutions which contain elements of both the off-board and the on-board type. Basically, no separate route to the destination is calculated for the slave vehicles of the group, but the route instructions the slave vehicles are provided with are based on the route taken by the master vehicle. For example, route instructions are calculated based on the current position of the respective slave vehicle and a route destination represented by the current position of the master vehicle.

In a preferred embodiment of the off-board version, the vehicles transmit their current position at certain temporal intervals to the remote central server where the positional data are processed with regard to underlying road map data and traffic condition data. In a preferred embodiment of the on-board version, the master vehicle transmits its current position to all slave vehicles of the group so that every slave vehicle of the group is provided with the complete positional data of the master vehicle. The route instructions are not calculated centrally in a central server, but are generated locally in the navigation unit of each vehicle based on the received position data. Further, it is possible that all vehicles of a group transmit their current position data to all other vehicles of the group so that every vehicle of the group is provided with the complete position data of the group.

According to one embodiment of the invention, the driver of the master vehicle is instructed not to exceed a certain speed or even to stop if one of the following slave vehicles is not able to keep pace. It is possible that the driver of the master vehicle travels too fast because he is so familiar with the traveled road that he does not notice any more the difficulties it poses to the drivers of the slave vehicles. When the—temporal and/or spatial—distance between the master and one of the slave vehicles exceeds a predefined limit, the driver of the master vehicle receives corresponding instructions which allow the slave vehicles to catch up. These instructions can originate—in the off-board version—in the central navigation server or—in the on-board version—in the data processing units contained in navigation units of the vehicles and may be issued visually and/or acoustically to the driver.

It is possible that the drivers start on a long travel to a remote destination which is unknown to each of the drivers. Then, in order to equally distribute responsibility, the drivers of the vehicles may have arranged among them to cyclically take over the status of the leading master vehicle. When the central server, the mediation server or the data processing units of the vehicles, respectively, receive a request from a slave vehicle regarding the transfer of the master status from the current master vehicle to the slave vehicle, the classification of the vehicles of the group is revised, and the requesting slave vehicle is granted the master status while the up-to-then master vehicle becomes a slave vehicle. It is possible that the driver of the master vehicle or the drivers of all vehicles have to confirm such a request before the master status can be transferred to another vehicle.

Further, it is possible that an additional vehicle wishes to join the group when the group is already en route. The driver of the additional vehicle may have come to know of the group by inquiring the mediation server, from where he receives the corresponding communication addresses. Alternatively, he was belatedly told about the group, i.e., after the building, and provided with the corresponding communication addresses by a driver of a vehicle. Likewise, a driver of a vehicle of the group has changed his mind and wishes to leave the group at a certain point of the trip. In either case, the central server, the mediation server or the data processing units of the vehicles, respectively, receive a request from a vehicle regarding its incorporation into or release from the group. The request may be immediately granted by the receiving unit. Alternatively, such a request has first to be confirmed by the driver of the master vehicle or by the drivers of all vehicles before it can be granted.

According to a further embodiment of the invention, when during travelling a reason arises in any of the vehicles of the group for a stop, the master vehicle or all vehicles of the group receive instructions which guide them to a suitable stop, i.e., a near stop which is sufficiently spacious to admit all the vehicles. The corresponding request for a stop is generated at a vehicle by dialing a specific telephone number or by pressing a specific "stop" button. This request is transmitted to the calculating and managing unit, e.g., the central server or the data processing units of the vehicles, respectively.

It is possible that the navigation server receives information on the current traffic conditions. This information usually is provided by police, travelers, road maintenance services, meteorological service, etc. and can be gathered at a central authority, e.g., a radio station from where it is wirelessly distributed to requesting users. Preferably, this data is received by a separate traffic data reception unit of the navigation server, then this data is transmitted to the data processing unit where it is taken into account for the calculation of the route instructions. Thus, the route instructions are based not only on the static road network but also on dynamic road data.

According to a preferred embodiment of the invention, the communication unit and/or the navigation unit assigned to each vehicle comprise specific operating and/or displaying means in order to facilitate the use of the navigation service like, e.g., buttons, switches, displays, LEDs, etc. For example, when requesting at the central server to build group, it is preferable for the requesting driver to just press a button specific for this purpose, e.g., at the navigation unit. This is much more user-friendly than having to dial a certain telephone number at the communication unit. The confirmation messages received at the driver's communication unit could be visualized to the driver, e.g., by means of a blinking LED, or by a specific display on the communication unit and/or the navigation unit.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF THE INVENTION

Figure 1:
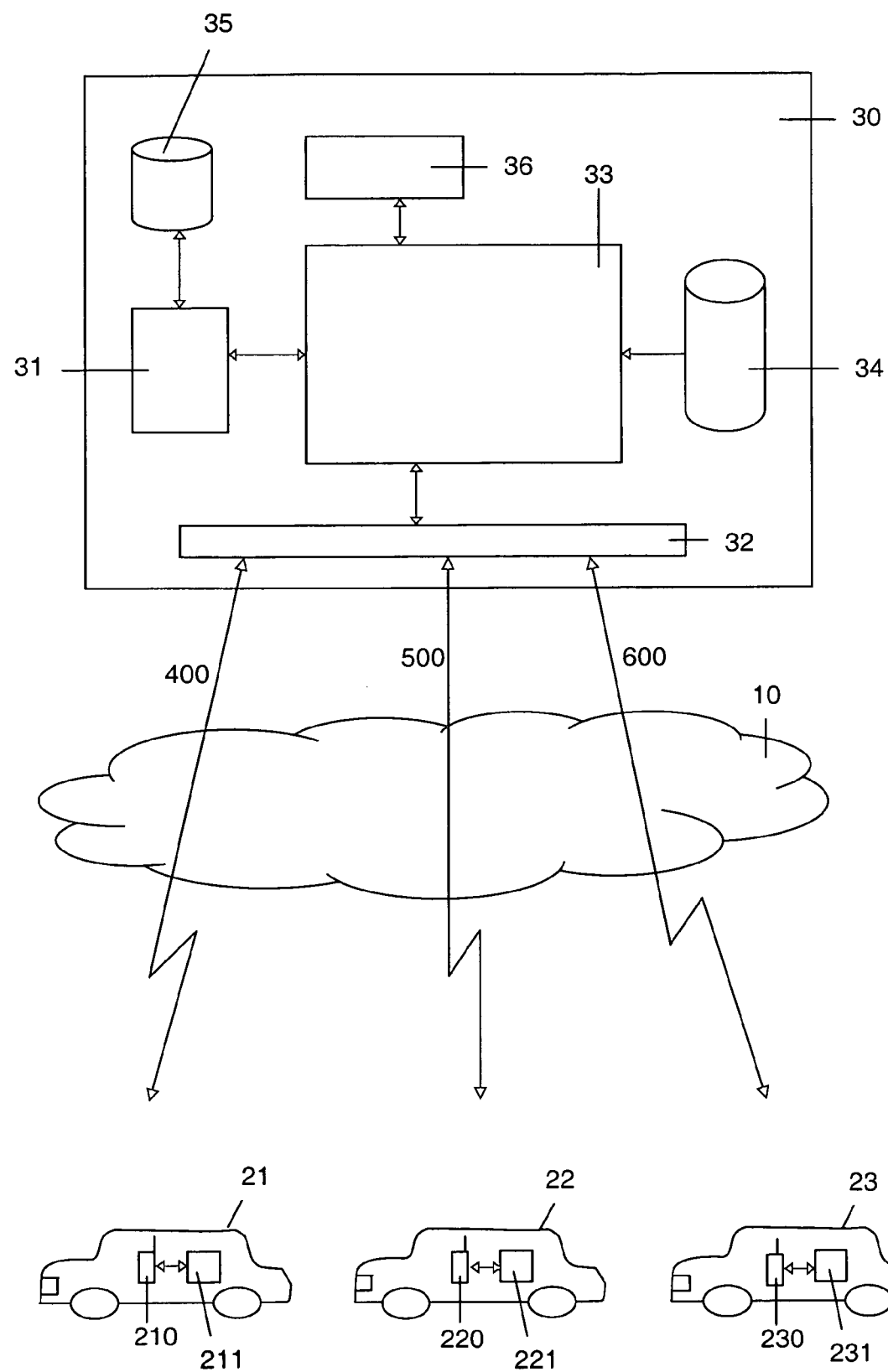
FIG. 1 is a block diagram of a system for providing vehicles with a navigation service according to a first embodiment of the invention.

FIG. 1 is a schematic block diagram of a first embodiment of the present invention.

FIG. 1 relates to an off-board solution of the navigation service showing three vehicles 21, 22, 23 which meet at a meeting point to form a group and to travel together as a group. Every vehicle 21, 22, 23 comprises a wireless communication unit 210, 220, 230 adapted for use of the navigation service and a navigation unit 211, 221, 231 adapted to receive geographic position data via a positioning system.

The wireless communication unit 210, 220 and 230 can be any electronic device which is adapted for communicating via a mobile communication network 10, e.g., a cellular communication network as a GSM or UMTS network, and which is adapted to be used in association with a navigation unit 211, 221 or 231. Preferably, it is a convenient mobile telephone, e.g., a Java-enabled cellular phone, but it can also be any other suitable device like, e.g., a PDA or a notebook with wireless communication function (PDA=Personal Digital Assistant). Preferably, the communication units 210, 220 and 230 support an always-on communication service, e.g. the GPRS communication service (GPRS=General Packet Radio Service).

The positioning system can be provided in form of satellite navigation system like, e.g., GPS, GLONASS, or Galileo, or via location based services offered by a mobile telecommunication network.

It is possible that the communication unit 210, 220, 230 and the respective navigation unit 211, 221, 231 are no two separate devices but are realized as a single device in form of an integrated solution.

The central server 30 is composed of one or several interlinked computers, i.e., a hardware platform, a software platform basing on the hardware platform and several application programs executed by the system platform formed by the software and hardware platform. The functionalities of the central server 30 are provided by the execution of these application programs.

From functional point of view, the central server 30 comprises an interface unit 32, a data processing unit 33, a group building unit 31, a data base 35, a road map data storage unit 34, and a traffic data reception unit 36.

Figure 2:
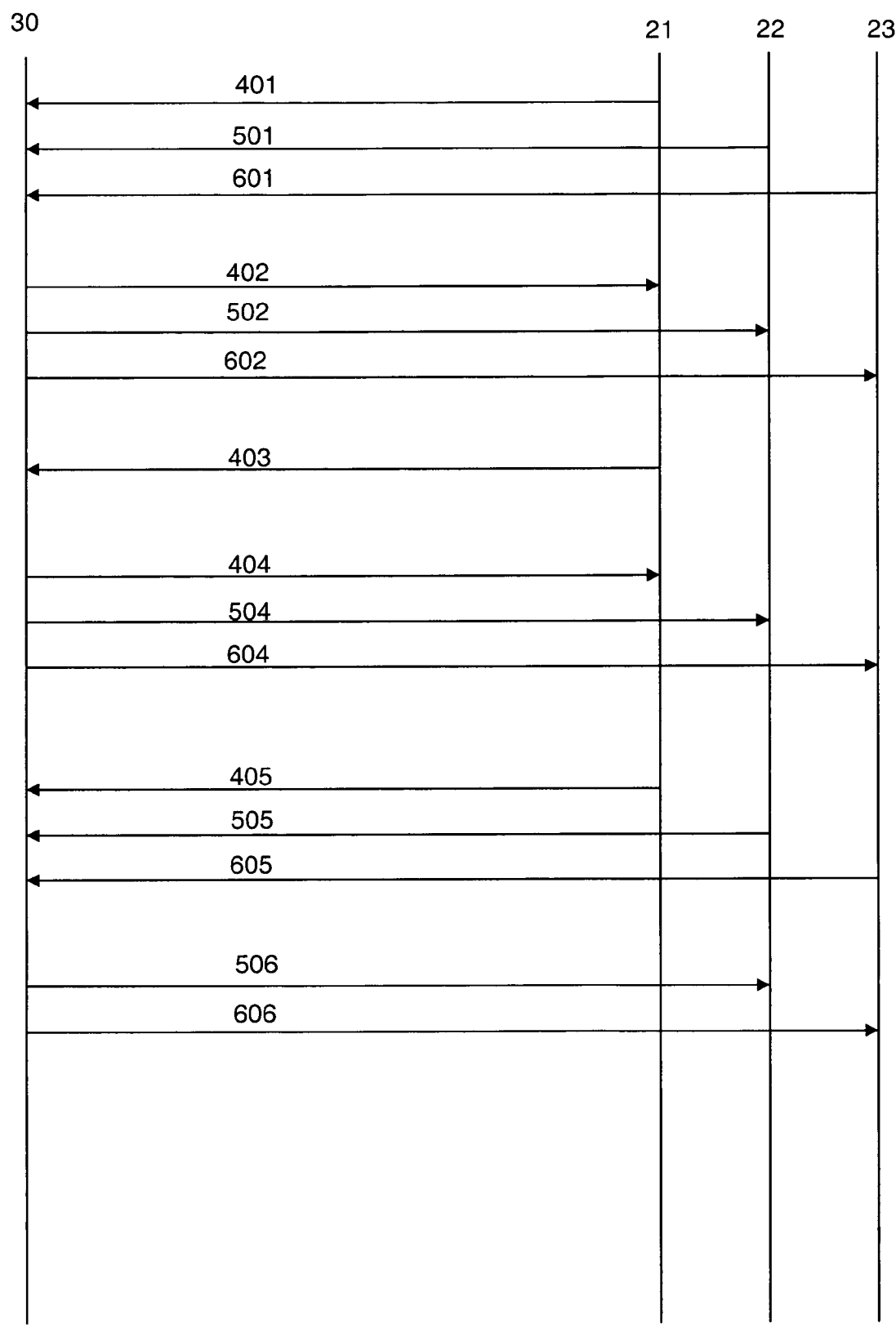
FIG. 2 is a diagram of the transmitted messages for providing vehicles with a navigation service according to a first embodiment of the invention.

The use of the navigation service comprises the exchange of messages 400, 500 and 600 between the vehicles 21, 22, 23 and the central server 30. Details of the messages 400, 500 and 600 are exemplified by hand of FIG. 2:

Initially, from every vehicle 21, 22, 23 a request message 401, 501, 601 is transmitted via a mobile communication network 10 to a remote central server 30. Preferably, this is achieved by pressing a specific button on the communication unit 210, 220, 230 or navigation unit 211, 221, 231. But it is also possible that the request message 401, 501, 601 is sent by dialing a specific number or in a similar way. The request messages 401, 501, 601 indicate to the central server 30 that the sending vehicles 21, 22, 23 wish to form a group for travelling together. The central server 30 responds by transmitting a confirmation message 402, 502, 602 to the requesting vehicles 21, 22, 23. After that, it is indicated to the central server 30 which of the vehicles will be the master vehicle. This is done by transmitting message 403 from the master vehicle 21 to the central server 30. Again, the central server 30 responds to this message 403 by transmitting a confirmation message 404, 504, 604 to the vehicles 21, 22, 23 of the group. After this transmission, the group has been built and the classification of the vehicles in master vehicle 21 and slave vehicles 22, 23 is completed. To enable the central server 30 to calculate accurate route instructions for the slave vehicles 22, 23 of the group, all the vehicles 21, 22, 23 of the group provide the central server 30 with their geographical position data 405, 505, 605. The data processing unit 33 of the central server 30 underlies this positional data with the stored road map data, and based on these data calculates route instructions for the slave vehicles 22, 23 of the group. The route instructions are sent in form of messages 506, 606 to the slave vehicles 22, 23.

For example, the request messages 401, 501, 601 indicate to the central server 30 that the vehicles 21, 22, 23 which have gathered at the same location request to form a group in order to travel together. Furthermore, the request messages 401, 501, 601 comprise the current geographic position and an identifier of each vehicle 21, 22, 23, i.e., of the communication unit 210, 220, 230 and/or navigation unit 211, 221, 231, preferably a communication address like an IP address. To every mobile phone registering at a mobile phone network, e.g., GSM or UMTS, an IP address is assigned which is valid until the mobile phone logs off the network. The central server 30 receives the request messages 401, 501, 601 by means of the interface unit 32 and identifies with help of the approximately identical geographical position data of the vehicles 21, 22, 23 the requesting vehicles. This is important for the case that in a neighboring street a different group of vehicles has gathered and also requests to build a group. Then the geographic resolution of the used positioning system allows to distinguish between the different groups.

The interface unit 32 of the central server 30 has the functionalities—similar to the communication units 210, 220, 230—to communicate via a mobile communication network 10, e.g., a cellular communication network as a GSM or UMTS network.

The group building unit 31 of the central server 30 builds a group comprising the requesting vehicles and stores the corresponding communication addresses of the group members in the data base 35. The building of a group comprises the steps of receiving and analyzing messages indicating the constitution of a group and potential members of the group, e.g. the request messages 401, 501 and 601, extracting, storing or interlinking information of group members, e.g. indicators of the vehicles 21, 22 and 23 and communication addresses assigned to the vehicles 21, 22, 23, in the data base 35 and assigning a classification to each member of the group based on the analyses, i.e. specify within the data base 35 whether a vehicle is classified as master or slave vehicle. At the end of the group building executed by the group building unit 31, the data base 35 contains a data structure indicating the members of the group, associated information of group members and the role of each member of the group, i.e. whether it is a master vehicle or a slave vehicle.

Further, it is possible that the group building unit 31 executes the group building process based on messages received via a web based interface from terminals that are not located within the vehicles 21, 22 and 23. Further, it is possible that the data base 35 already contains subscriber data of a plurality of potential group members. Such subscriber data may contain an identification of the respective vehicle and/or the driver of the vehicle, communication address(es) of communication unit(s) assigned to the respective vehicle, position data of the respective vehicle or preference data assigned to the vehicle and/or the driver, e.g. information about routes frequently traveled by the respective driver. The group building unit 31 selects the members of a group out of these pre-registered potential group members and interlinks such prestored user information to constitute a group.

The data base 35 is updated when additional vehicles join the group or when vehicles leave the group. To acknowledge that the group has been built and that each requesting vehicle has been included in the group, the central server 30 transmits a confirmation message 402, 502, 602 to every vehicle 21, 22, 23 of the group. The confirmation message 402, 502, 602 is signaled to each driver, e.g., by a blinking display of the communication unit 210, 220, 230 or navigation unit 211, 221, 231 reading "slave".

In a next step, the driver of the vehicle who will lead the group, i.e., the driver of the "master" vehicle 21 who will drive ahead of the remaining vehicles of the group, i.e., the "slave" vehicles 22, 23, transmits a corresponding message 403 to the central server. Preferably, this is achieved by pressing a specific "master" button on the communication unit 210. But it is also possible that the message 403 is sent by dialing a specific telephone number, or in a similar way. Again, the message 403 comprises the identifier of the leading vehicle 21, i.e., of its communication unit 210 and/or navigation unit 211.

The central server 30 recognizes the master vehicle 21 and replies with a confirmation message 404 to the master vehicle 21 and confirmation messages 504, 604 to the slave vehicles 22, 23. These confirmation messages 404, 504, 604 are conveniently indicated to the driver of the master vehicle 21 and to the drivers of the slave vehicles 22, 23. For example, the display of the communication unit 210 in the master vehicle 21 changes to a steady display reading "master", whereas the display of the communication units 220, 230 in the slave vehicles 22, 23 changes to a steady display reading "slave".

As a result, the log-on of the group at the central server 30 and the classification of the vehicles 21, 22, 23 of the group into a master vehicle and remaining slave vehicles is completed. At this stage, the group can begin to travel together.

The current geographical position of each vehicle 21, 22, 23 of the group is determined by means of a navigation system and is communicated, together with a respective communication address, in form of a position message 405, 505, 605 from the communication units 210, 220, 230 assigned to the vehicles 21, 22, 23 to the central server 30, preferably at predefined time intervals. The communication units 210, 220, 230 assigned to the vehicles 21, 22, 23 can be adapted to automatically transmit this information, or the central server 30 can cyclically poll the vehicles 21, 22, 23 of the group.

From this positional information 405, 505, 605 the data processing unit 33 calculates for each of the slave vehicles 22, 23 route instructions 506, 606 which enable the slave vehicles 22, 23 to travel in accordance with the route traveled by the master vehicle 21. In other words, the master vehicle 21 leads the group, thereby defining a master route, and the slave vehicles 22, 23 receive route instructions 506, 606 to follow the master vehicle 21 on the master route. For example, the data processing unit 33 iteratively executes a route processing task for each of the slave vehicles with the current position of the respective slave vehicle as starting point and the current position of the master vehicle as sliding destination point. Such processing is preferably done by means of a convential route processing algorithm feeded by these specific input parameters. Then, the data processing unit 33 calculates associated route instructions for each slave vehicle to guide the slave vehicle on the calculated route.

The route instructions 506, 606 are transmitted to the slave vehicles 22, 23 and communicated to the respective drivers, in form of visual instructions on a display and/or in form of voice instructions. For the calculation of the route instructions, the data processing unit 33 uses road map data stored in a road map data storage unit 34. Preferably, the data processing unit 33 uses—in addition to the road map data—traffic condition data received by the traffic data reception unit 36.

In an further embodiment, the slave vehicles 22, 23 are always guided to travel on the same route as the master vehicle 21. Therefore, if a slave vehicle 22, 23 loses its way, it is guided back to the spot where it deviated from the master route. In an alternative embodiment, a slave vehicle 22, 23 which has lost its way is not strictly guided back to the spot where it deviated from the master route, but it is guided on the shortest route to rejoin the master route. Thus, it may use other roads than currently traveled by the rest of the group, but it will rejoin the master route after a certain time.

During the log-on at the central server 30, the request message 401, 501, 601 transmitted to the central server 30 indicates which group navigation service is needed. Usually the driver of the master vehicle 21 will be familiar with the route to travel. Therefore he drives without further help. But it is also possible that neither the driver of the master vehicle 21 nor the drivers of the slave vehicles 22, 23 know the route to a common destination, e.g., when travelling for the first time to a certain place. In this case, it is signaled to the central server 30, that the driver of the master vehicle 21 has to be provided with route information to reach a destination. The destination is transmitted to the central server 30, and a corresponding route is calculated by the data processing unit 33 of the central server 30 and transmitted to the communication unit 210 assigned to the master vehicle 21.

If an additional vehicle wishes to join later on the travelling group, the current master vehicle 21 first releases its master status, e.g., by repressing the "master" button on the communication unit 210 or navigation unit 211. Triggered by this button, a corresponding information is transmitted to the central server 30. In response to that, the central server 30 transmits a message to all vehicles 21, 22, 23 of the group where the display of the communication unit 210, 220, 230 or navigation unit 211, 221, 231 begins to blink reading "slave". Now, the additional vehicle sends a request message to the central server 30. As was already mentioned above, this is achieved by pressing a specific button on the communication unit or navigation unit or by dialing a specific number or in a similar way. The message is acknowledged from the central server 30 to the additional vehicle by a confirmation message, and the confirmation message is signaled to the driver of the additional vehicle, e.g., by a blinking display of the communication unit or navigation unit reading "slave". This way, the additional vehicle has been logged on at the central server 30 and has joined the group.

Figure 3:
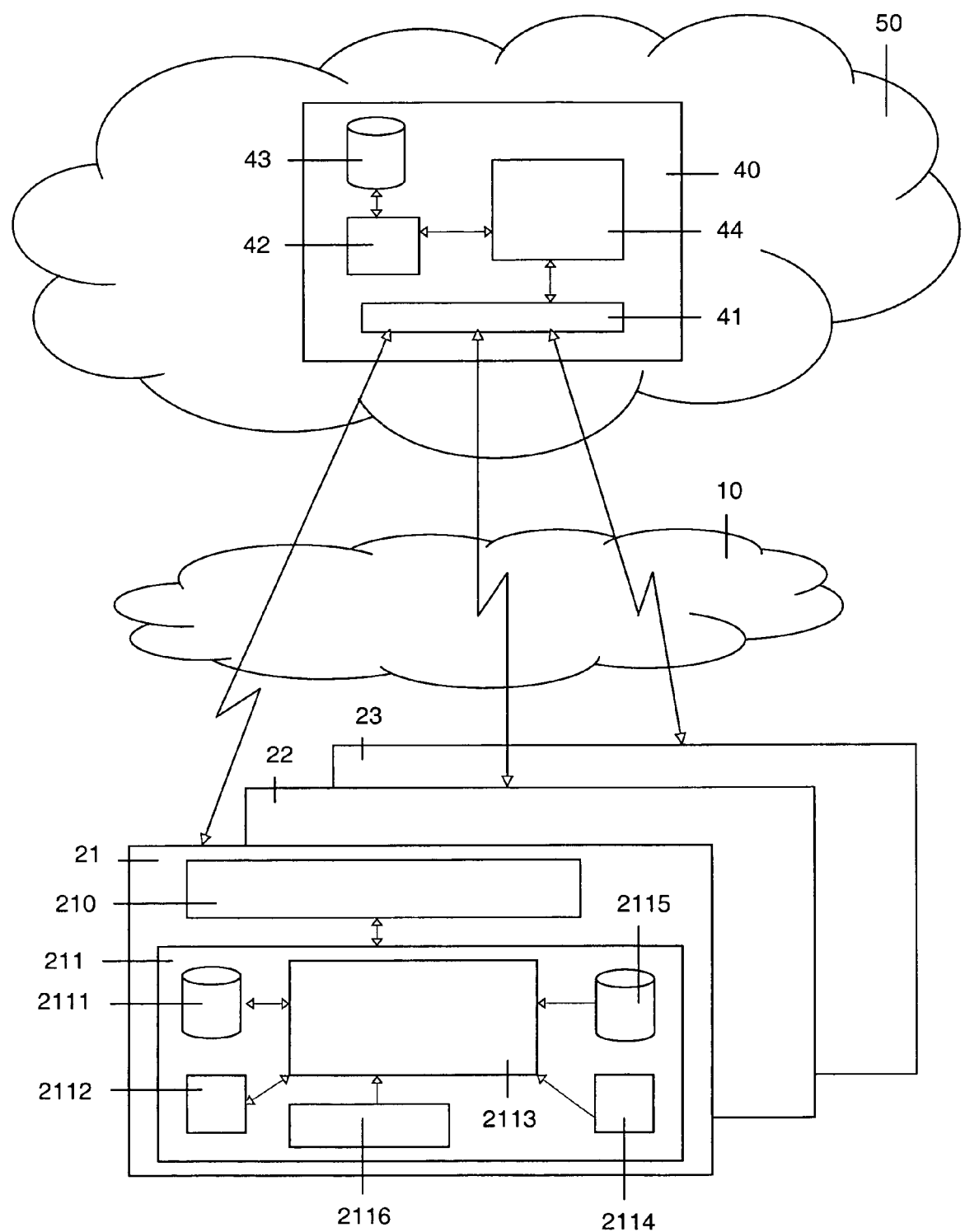
FIG. 3 is a block diagram of a system for providing vehicles with a navigation service according to another embodiment of the invention.

Another embodiment of the invention is exemplified by hand of FIG. 3.

FIG. 3 relates to an on-board solution of the navigation service. It shows three vehicles 21, 22, 23, each vehicle 21, 22, 23 comprising a communication unit 210, 220, 230 coupled to a navigation unit 211, 221, 231.

Each of the navigation units 211, 221, 231 is composed of an electronic circuit having at least one microprocessor, application programs executed by the at least one microprocessor, and input and output means, for example a microphone, a loudspeaker, a keypad and a display. The functionalities of the navigation unit 211, 221, 231 are performed by the interaction of these hardware and software components. From functional point of view, the navigation unit 211, 221, 231 comprises data bases 2111, 2211, 2311 for storing communication addresses of the vehicles 21, 22, 23, output units 2112, 2212, 2312, data processing units 2113, 2213, 2313, position data receivers 2114, 2214, 2314, road map data bases 2115, 2215, 2315, and traffic data reception units 2116, 2216, 2316, respectively. From the vehicles 21, 22, 23 messages can be exchanged with a mediation server 40 via a wireless communication network 10. This communication network 10 can be a mobile phone communication network or it can also be a direct radio communication network used for the navigation service. The mediation server 40, which comprises an interface unit 41, a group building unit 42, an address storage unit 43 and a mediation unit 44, can also be accessed via the Internet 50.

In this embodiment of the invention, the drivers of the vehicles 21, 22, 23 access the mediation server 40 via the Internet 50 to declare their interest in joining a travel group to a certain destination. For this purpose, a special software may be running on the mediation unit 44 which is adapted to bring together people who want to travel in a group of vehicles, e.g., from town A to town B. It is also possible that the drivers access the mediation server 40 by means of telecommunication terminals, e.g., mobile phones. When two or more drivers have enrolled for the same trip, the mediation unit 44 mediates the travel date and start time, and confirms to the drivers that they will be integrated into a group. Parallely, the software requests from the drivers a communication address assigned to each vehicle 21, 22, 23. This may be the IP address of the communication unit 210, 220, 230 assigned to each vehicle. The mediation server 40 may be provided with the communication address of the communication unit 210, 220, 230 by calling a telephone number assigned to the mediation server 40 with the communication unit 210, 220, 230, which preferably is a mobile phone.

After the drivers have provided the mediation server 40 with the communication addresses and have indicated which driver will lead the group, i.e., which vehicle will be the master vehicle, the group building unit 42 builds a group of these drivers and their vehicles 21, 22, 23, respectively, and stores the corresponding communication addresses in the address storage unit 43. The drivers receive a confirmation message that the group has been built and that the trip can begin.

After the receipt of the confirmation, the drivers begin the travel at the agreed-on date, get into their vehicles 21, 22, 23 and switch on the navigation units 211, 221, 231 and the communication units 210, 220, 230 which are coupled among each other. The communication units 210, 220, 230 receive from the mediation server 40 via the communication network 10 the communication addresses which are stored in the data base 2111, 2211, 2311. Now that the group has been built and the addresses have been transmitted, the connections between the mediation server 40 and the communication units 210, 220, 230 are closed for the time being. From now on the communication units 210, 220, 230 communicate among them via the communication network 10.

At the beginning of the travel, each data processing unit 2113, 2213, 2313 receives the current geographical position data of every vehicle 21, 22, 23 from the position data receiver 2114, 2214, 2314. For that purpose the position data receiver 2114, 2214, 2314 comprises a receiver to receive signals from a navigation system, e.g., a GPS receiver. Each vehicle 21, 22, 23 shares its geographical position data with the other vehicles of the group via the communication network 10. Finally, each vehicle 21, 22, 23 has the same and complete set of positional information. Then the route instructions are calculated locally in each data processing unit 2113, 2213, 2313 for the respective vehicle 21, 22, 23, based on the geographical position data and the road map data stored in the road map data base 2115, 2215, 2315.

During the entire duration of the travel, the geographical position data of each vehicle 21, 22, 23 is transferred at predefined temporal intervals to every other vehicle of the group by means of the communication unit 210, 220, 230 via the communication network 10. This way, it is assured that every data processing unit 2113, 2213, 2313 is provided with the current positions of every vehicle 21, 22, 23 of the group. Typically, the driver of the master vehicle 21 is familiar with the route and does not need route instructions. But in case the driver of the master vehicle 21 does not know the route, the respective data processing unit 2113 of the master vehicle 21 calculates route instructions for the master vehicle 21. In either case the data processing units 2212, 2313 assigned to the slave vehicles 22, 23 calculate route instructions which enable the drivers of the slave vehicles 22, 23 to follow the master vehicle 21, i.e., to take the same route as the master vehicle 21.

In a preferred embodiment, the data processing units 2113, 2213, 2313 also take into account current traffic data received from a traffic data reception unit 2116, 2216, 2316 when calculating route instructions. The calculated route instructions are then communicated to the respective driver by means of an output unit 2112, 2212, 2312. It is also possible that the route instructions are transferred to the communication unit 210, 220, 230 and are communicated from there to the driver. This has the advantage that no separate display has to be provided in the navigation unit 211, 221, 231. Instead the display of the communication unit 210, 220, 230 is used which makes the solution cheaper.

If any of the slave vehicles 22, 23 of the group falls behind the master vehicle 21 so that a predefined spatial and/or temporal limit is exceeded, the data processing unit 2113 of the master vehicle 21 triggers the output unit 2112 of the master vehicle 21 to indicate to the driver of the master vehicle 21 to travel at a slower speed and to stop, respectively. The data processing unit 2113 of the master vehicle 21 is able to respond to this situation because it is provided with the geographical position data of the master vehicle 21 and all of the slave vehicles 22, 23.

Similarly, in case one of the slave vehicles 22, 23 wants to take over the master status from the current master vehicle 21, it signalizes this request to the other vehicles of the group by means of the communication unit 220, 230. Then the data processing units of the other vehicles calculate suitable instructions. It is possible that the drivers of the other vehicles have to confirm such requests before they are processed.

Furthermore, if any of the slave vehicles 22, 23 wants the group to stop at a resting place, it signalizes this request to the master vehicle 21. The data processing unit 2113 of the master vehicle 21 then identifies a suitable stop and outputs the respective instructions to the driver of the master vehicle 21. It is also possible that such requests are coordinated among the data processing units 2113, 2213, 2313 of all vehicles of the group, and that the drivers have to confirm corresponding proposals of the data processing units 2113, 2213, 2313 indicated to them by means of the output unit 2112, 2212, 2312.

If an additional vehicle wishes to join the group en route, it uses the communication addresses to contact the vehicles 21, 22, 23 of the group. It is possible that it has accessed these communication addresses from the mediation server 40, or alternatively it has received these communication addresses from any of the group members. After the vehicles 21, 22, 23 of the group have received the request, they incorporate the additional vehicle by enrolling its communication address in the a data base 2111, 2211, 2311. Preferably, the vehicles will contact the mediation server 40 to inform the mediation server 40 about the additional vehicle and its communication address. Then the mediation server 40 can update the list of communication addresses stored in the address storage unit 43.

If an additional vehicle wishes to leave the group en route, again it uses the communication addresses to contact the vehicles 21, 22, 23 of the group. Then its communication address is deleted from the storage units 2111, 2211, 2311 of every vehicle 21, 22, 23, and preferably from the address storage unit 43 of the mediation server 40, in analogy to the process described above.

Figure 4:
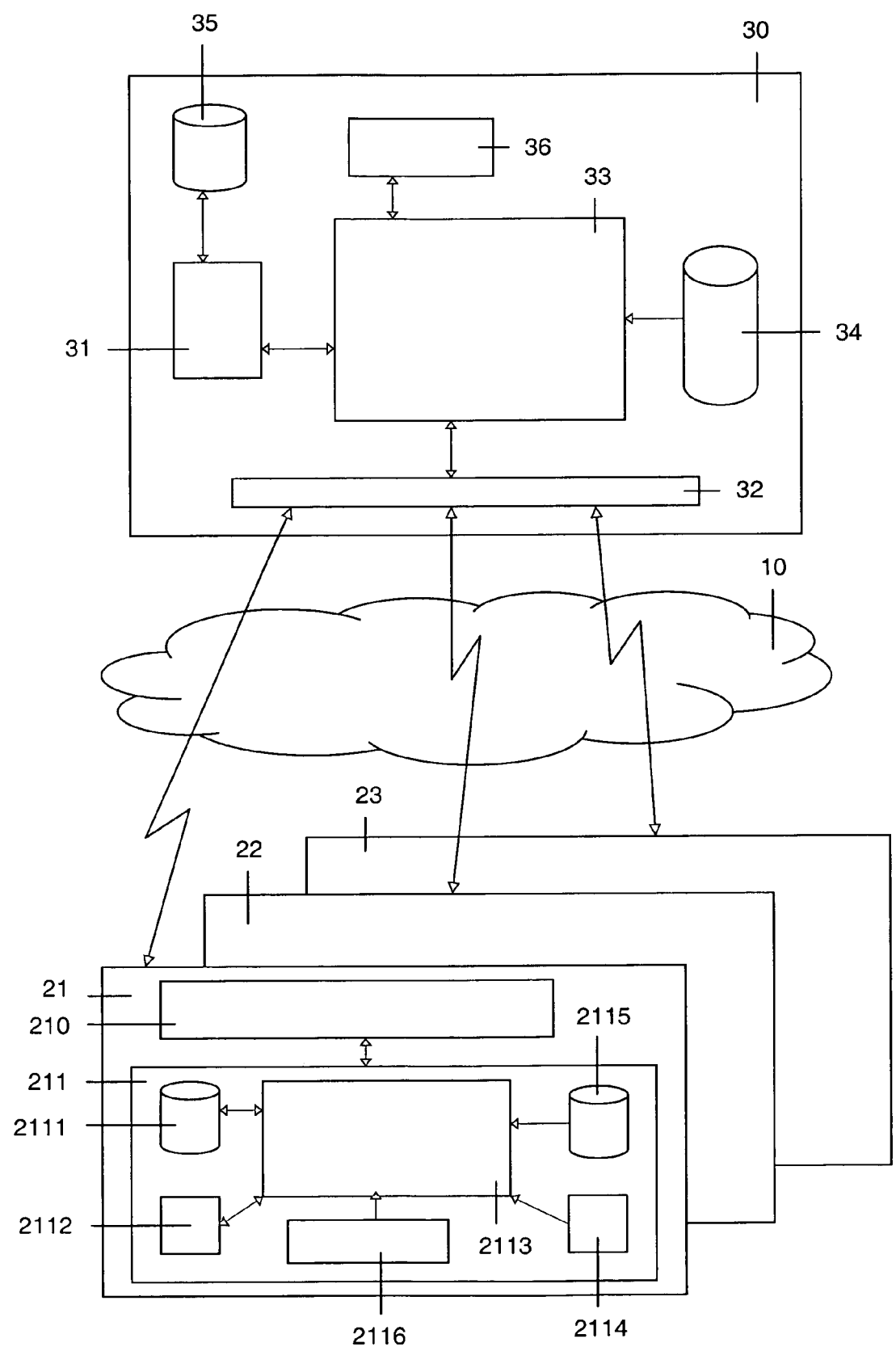
FIG. 4 is a block diagram of a system for providing vehicles with a navigation service according to a further embodiment of the invention.

A further embodiment of the invention is exemplified by hand of FIG. 4.

FIG. 4 relates to a hybrid solution of the navigation service, i.e., a solution which comprises elements both of an off-board and an on-board solution. It shows—like FIG. 3—three vehicles 21, 22, 23, each vehicle 21, 22, 23 comprising a communication unit 210, 220, 230 coupled to a navigation unit 211, 221, 231. Again, the navigation unit 211, 221, 231 comprises a data base 2111, 2211, 2311 for storing communication addresses of the vehicles 21, 22, 23, an output unit 2112, 2212, 2312, a data processing unit 2113, 2213, 2313, a position data receiver 2114, 2214, 2314, a road map data base 2115, 2215, 2315, and a traffic data reception unit 2116, 2216, 2316.

The vehicles 21, 22, 23 communicate via a communication network 10 with a central server 30, as the one described in the description of FIG. 1. This means the central server 30 comprises an interface unit 32, a data processing unit 33, a group building unit 31 with a data base 35, a road map data storage unit 34, and a traffic data reception unit 36. Thus, both the central server 30 as well as the data processing units 2113, 2213, 2313 in each vehicle 21, 22, 23 have computational power to calculate route instruction.

In this embodiment, the central server 30 stores in the road map data storage unit 34 current road map data which is continuously updated with changes in road network and traffic conditions. By means of the communication unit 210, 220, 230, the navigation unit 211, 221, 231 receives from the central server 30 road map data covering a route corridor. This route corridor is defined by a roughly pre-calculated route plus a corridor of a certain breadth on either side of the pre-calculated route, calculated by the central server 30. On the basis of this pre-selected current road map data, the data processing units 2113, 2213, 2313 on board of the vehicles calculate the detailed route, according to the embodiment with regard to FIG. 3.

The advantage of the hybrid solution with regard to the off-board solution is that the connection between the central server 30 and the vehicles 21, 22, 23 has not to be kept up continuously over a long time interval. It is only during the download of the route corridor that the resources of the communication network 10 are used. After that the route calculation takes place locally and no communication connections have to be occupied. It is only when a vehicle is going to leave the route corridor that the corresponding additional map areas have to be downloaded from the central server to the vehicle. The advantage of the hybrid solution with regard to the on-board solution is that, although the resources of the communication network are spared, the drivers are provided with the latest road map data, updated by a powerful central server 30.

The invention claimed is:

1. A method for providing vehicles with a navigation service, the method comprising the steps of:

building by a mediation server, a group of two or more vehicles, each vehicle comprising a communication unit coupled with a navigation unit, wherein one vehicle of the group is classified as master vehicle leading the group and the remaining vehicles of the group are classified as slave vehicles following the master vehicle;

storing communication addresses allocated to the communication units assigned to the vehicles of the group, and communicating, by the mediation server the stored communication addresses to the navigation units assigned to the vehicles of the group;

determining geographical position data of the master vehicle and the slave vehicles;

communicating geographical position data of the master vehicle and the slave vehicles to one or more data processing units;

calculating by the one or more data processing units for each of the slave vehicles route instructions in accordance with the route traveled by the master vehicle based on the received geographical position data of the master vehicle and the respective slave vehicle;

communicating the respective route instructions to a driver of each slave vehicle, wherein the vehicles are manually controlled by drivers, and wherein the mediation server is remote from the vehicles and all vehicles communicate with each other through the mediation server.

2. The method of claim 1, wherein the step of communicating route instructions to a driver of a slave vehicle comprises indicating the position of the master vehicle and the slave vehicle on a road map electronically displayed on a display.

3. The method of claim 1, wherein the driver of the master vehicle receives an instruction to travel at a slower speed or to stop if a temporal distance and/or a spatial distance to a slave vehicle exceeds a predefined limit.

4. The method of claim 1, wherein the method further comprises the step of transferring the master status from the master vehicle to a slave vehicle after receipt of a corresponding request message from the slave vehicle.

5. The method of claim 1, wherein the method further comprises the step of incorporating a vehicle into the group en route or releasing a vehicle from the group en route after receipt of a corresponding request message from the vehicle.

6. The method of claim 1, wherein the method further comprises the step of calculating route instructions for guidance to a suitable stop and communicating these route instructions to the driver of the master vehicle or to the drivers of all vehicles of the group after receipt of a corresponding request message requesting a stop from a vehicle of the group.

7. The method of claim 1, wherein the group comprises vehicles originating from same location at the time of the group formation and heading for same destination as provided by the master vehicle.

8. The method of claim 1, wherein the group is formed by receiving request messages from each of the vehicles in the group, said request messages indicating that the respective vehicle is to form a group and wherein the group is formed by geographic positioning data such that vehicles sending the requests that are at substantially identical geographic location form the group.

9. The method of claim 8, wherein the master vehicle is obtained from a status of the vehicle specified in the request message.

10. The method of claim 8, wherein the master vehicle is determined based on geographic position of each vehicle in the group and destination.

11. The method of claim 8, wherein the request messages are submitted via web from terminals that are not located within the vehicles.

12. A method for providing vehicles with a navigation service, the method comprising:

forming a group of at least two vehicles, each vehicle comprising a communication unit and a navigation unit, where one vehicle of the group is classified as master vehicle leading the group to a destination and the remaining vehicles of the group are classified as slave vehicles following the master vehicle to the same destination;

determining geographical position data of the master vehicle and the slave vehicles;

calculating for each of the slave vehicles route instructions in accordance with the route traveled by the master vehicle based on the geographical position data of the master vehicle and the respective slave vehicle; and communicating the respective route instructions to each slave vehicle such that said each slave vehicle follows the master vehicle, wherein the vehicles are manually controlled by drivers, and wherein all vehicles communicate with each other through the mediation server that is remote from the vehicles.

13. The method of claim 1, wherein communication addresses allocated to the communication units are Internet Protocol (IP) addresses.

14. The method of claim 1, wherein the route instructions are displayed on an electronic road map.

15. The method of claim 1, wherein the slave vehicles following the master vehicle are vehicles traveling to a destination that is a same destination traveled to by the master vehicle.

16. The method of claim 1, wherein the route instructions are calculated based on road map data and guide a driver of a vehicle along a route to a destination.

17. The method of claim 1, wherein the driver of the slave vehicle receives route instructions that guide the slave vehicle along an alternate route not used by the master vehicle to rejoin the master vehicle if the slave vehicle deviates from a route traveled by the master vehicle.

18. The method of claim 1, wherein the group of vehicles comprises at least one master vehicle and two or more slave vehicles.

* * * * *

UNITED STATES PATENT AND TRADEMARK OFFICE
CERTIFICATE OF CORRECTION

PATENT NO.      : 7,613,563 B2                                          Page 1 of 1
APPLICATION NO. : 11/300472
DATED           : November 3, 2009
INVENTOR(S)     : Haegebarth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 399 days.

Signed and Sealed this

Nineteenth Day of October, 2010

David J. Kappos
*Director of the United States Patent and Trademark Office*